United States Patent
Sugino (10) Patent No.: US 10,586,630 B2
(45) Date of Patent: Mar. 10, 2020

(54) WIRE HARNESS

(71) Applicant: Sumitomo Wiring Systems, Ltd., Yokkaichi, Mie (JP)

(72) Inventor: Hidetoshi Sugino, Mie (JP)

(73) Assignee: Sumitomo Wiring Systems, LTD., Yokkaichi, Mie (JP)

( * ) Notice: Subject to any disclaimer, the term of this patent is extended or adjusted under 35 U.S.C. 154(b) by 7 days.

(21) Appl. No.: 15/837,053

(22) Filed: Dec. 11, 2017

(65) Prior Publication Data
US 2018/0182509 A1 Jun. 28, 2018

(30) Foreign Application Priority Data
Dec. 27, 2016 (JP) .................................. 2016-252352

(51) Int. Cl.
*H01B 7/00* (2006.01)
*H01B 7/18* (2006.01)
*H02G 3/04* (2006.01)

(52) U.S. Cl.
CPC ......... *H01B 7/0045* (2013.01); *H01B 7/1805* (2013.01); *H02G 3/0462* (2013.01)

(58) Field of Classification Search
CPC ............. B60R 16/0215; H01B 7/0045; H01B 7/1805; H01B 7/00; H01B 7/18; H02G 1/00; H02G 3/0462; H02G 3/04; E21B 17/1035; F16L 35/00; Y10T 29/49893
USPC .......................................... 174/72 A; 29/463
See application file for complete search history.

(56) References Cited

U.S. PATENT DOCUMENTS

| | | | | |
|---|---|---|---|---|
| 3,192,377 | A * | 6/1965 | Abolins | B60Q 1/32 362/485 |
| 4,615,543 | A * | 10/1986 | Cannon | F16L 35/00 166/241.4 |
| 4,797,512 | A * | 1/1989 | Kumagai | H02G 15/18 174/135 |
| 2010/0230157 | A1* | 9/2010 | Sakata | B60R 16/0215 174/72 A |

FOREIGN PATENT DOCUMENTS

| | | | | |
|---|---|---|---|---|
| CN | 202100329 U | * | 1/2012 | ............. F02B 77/00 |
| JP | 57162912 U | * | 10/1982 | ............. B23K 31/00 |
| JP | 2015146673 A | | 8/2015 | |

OTHER PUBLICATIONS

Round Cable Runway_Data-Tech_Apr_2015_&_Sept_2016.*

* cited by examiner

*Primary Examiner* — Timothy J Thompson
*Assistant Examiner* — Guillermo J Egoavil
(74) *Attorney, Agent, or Firm* — Reising Ethington, P.C.

(57) ABSTRACT

A wire harness that allows branched locations to be defined and can be manufactured inexpensively. A wire harness includes a tubular bendable pipe through which a wire is inserted. The pipe includes pull-out ports of the wire at positions corresponding to branching locations of the wire. The pull-out ports are configured to open on the respective mating surfaces of a first divided segment and a second divided segment obtained by circumferentially dividing the pipe into two. Bushes serving as protection portions that protect the wire are provided at rims of the pull-out ports.

5 Claims, 9 Drawing Sheets

Figure 9

WIRE HARNESS

CROSS REFERENCE TO RELATED APPLICATIONS

This application claims the priority of Japanese patent application JP2016-252352 filed on Dec. 27, 2016, the entire contents of which are incorporated herein.

TECHNICAL FIELD

The present invention relates to a wire harness.

BACKGROUND ART

The wire harness disclosed in JP 2015-146673A includes a plurality of wires and a protector that accommodates the wires. The protector includes a body portion that is integrally molded using a synthetic resin. The body portion is made up of a bottom plate portion, and a pair of side wall portions that stand upright from opposite edges of the bottom plate portion. A space capable of accommodating the wires is formed between the bottom plate portion and the pair of side wall portions. The opening of the body portion that is located between distal ends of the pair of side wall portions is closed by a lid portion that is integrally molded using a synthetic resin.

JP 2015-146673 is an example of related art.

SUMMARY

Meanwhile, it is often the case that wire harnesses with branches are usually configured by winding a tape around a bundle of wires including the wires, and branch lines are pulled out from branching locations. However, merely winding the tape around the wire bundle cannot prevent the wire bundle from being twisted. If the wire bundle is twisted, the branched locations change, and the branch lines do not properly oppose the corresponding connection targets, resulting in uncertainty and errors during a connection operation.

When the above-described related art is used to solve this problem, the twisting of the wire bundle can be prevented by the protector, making it possible to define the branched locations. However, a branching structure needs to be newly provided in the protector, and therefore, the structure of a mold for molding the protector becomes more complex, resulting in the problem of an increase in mold costs.

The present design has been completed in light of the above-described circumstances, and it is an object of the design to provide a wire harness that allows branched locations to be defined and can be manufactured inexpensively.

An aspect of the present design is directed to a wire harness including a tubular bendable pipe through which a wire is inserted, wherein the pipe includes a pull-out port for the wire at a position corresponding to a branching location of the wire.

The pipe can be made to conform to the routing path of the wire through bending. In addition, the pull-out port of the pipe serves as the branching position of the wire, thus making it possible to define the branched location. Moreover, the use of a pipe does not require a complex mold structure, and thus allows the wire harness to be manufactured more inexpensively than in the case of molding a resin protector using a mold as in the conventional art.

EMBODIMENTS

Preferred embodiments of the present design will be described below.

The pipe may be composed of segments that are circumferentially divided into two with mating surfaces interposed therebetween, and at least one of the two divided segments may include the pull-out port configured to be open on the corresponding mating surface. Since the pipe is composed of the divided segments that have been divided into two, the two divided segments can be combined from the state in which the wire extends along one of the divided segments, and is not necessary to perform an operation of inserting the wire through a cylindrical pipe, leading to excellent routing operability. In addition, the pull-out port is configured to be open in a mating surface of at least one of the divided segments, thus facilitating a manufacturing process of the divided segments The two divided segments may be fixed together with the mating surfaces abutted against each other. This makes it possible to prevent the wire from being damaged as a result of the pipe being accidentally opened. Here, examples of the fixing means for fixing the divided segments together, include welding, brazing, and the use of an adhesive material.

A protection portion that protects the wire may be provided at a rim of the pull-out port. This makes it possible to protect the wire from an edge that may be formed at the rim of the pull-out port.

Embodiment 1

Figure 8:
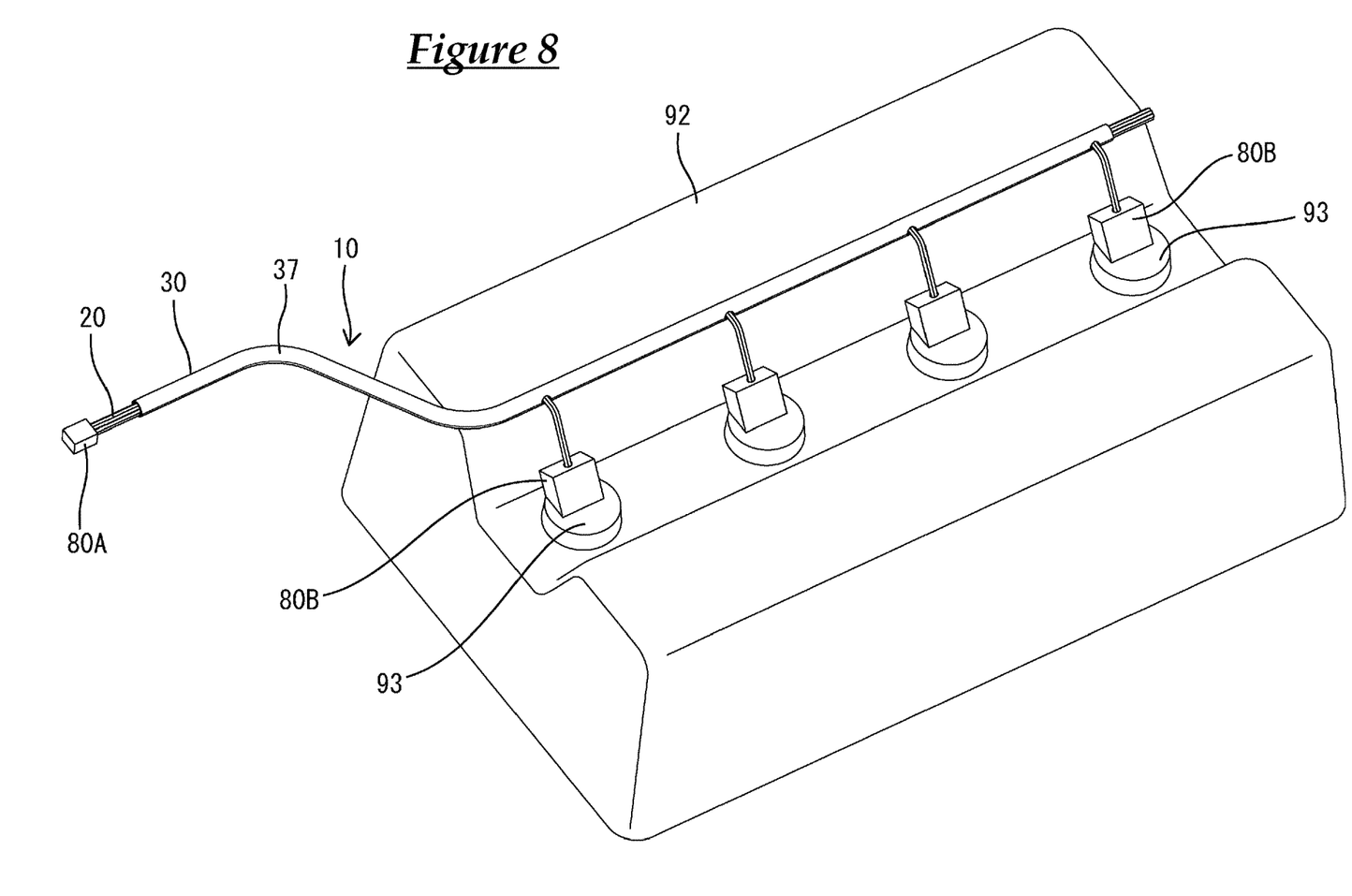
FIG. 8 is a perspective view showing an exemplary usage of the wire harness.
Figure 9:
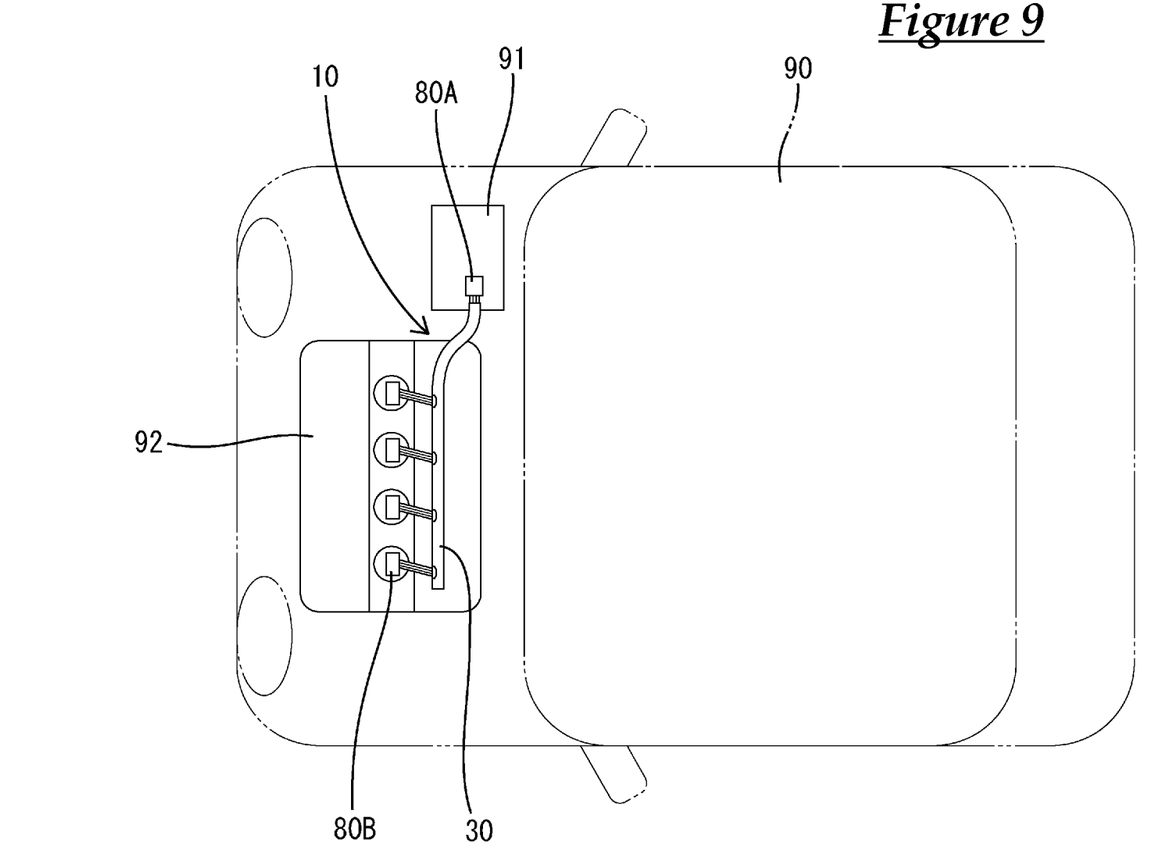
FIG. 9 is a conceptual diagram of a wire harness that is routed in a vehicle.

Hereinafter, Embodiment 1 will be described with reference to the drawings. A wire harness 10 according to Embodiment 1 is configured to be routed so as to connect a plurality of electric devices. For example, as shown in FIGS. 8 and 9, the wire harness 10 is routed inside the engine room of a vehicle 90, and is used when electrically connecting a junction box 91 and a plurality of control portions 93 that perform drive control of an engine 92. The wire harness 10 includes a plurality of wires 20 and a long tubular pipe 30 through which the wires 20 are inserted.

Figure 1:
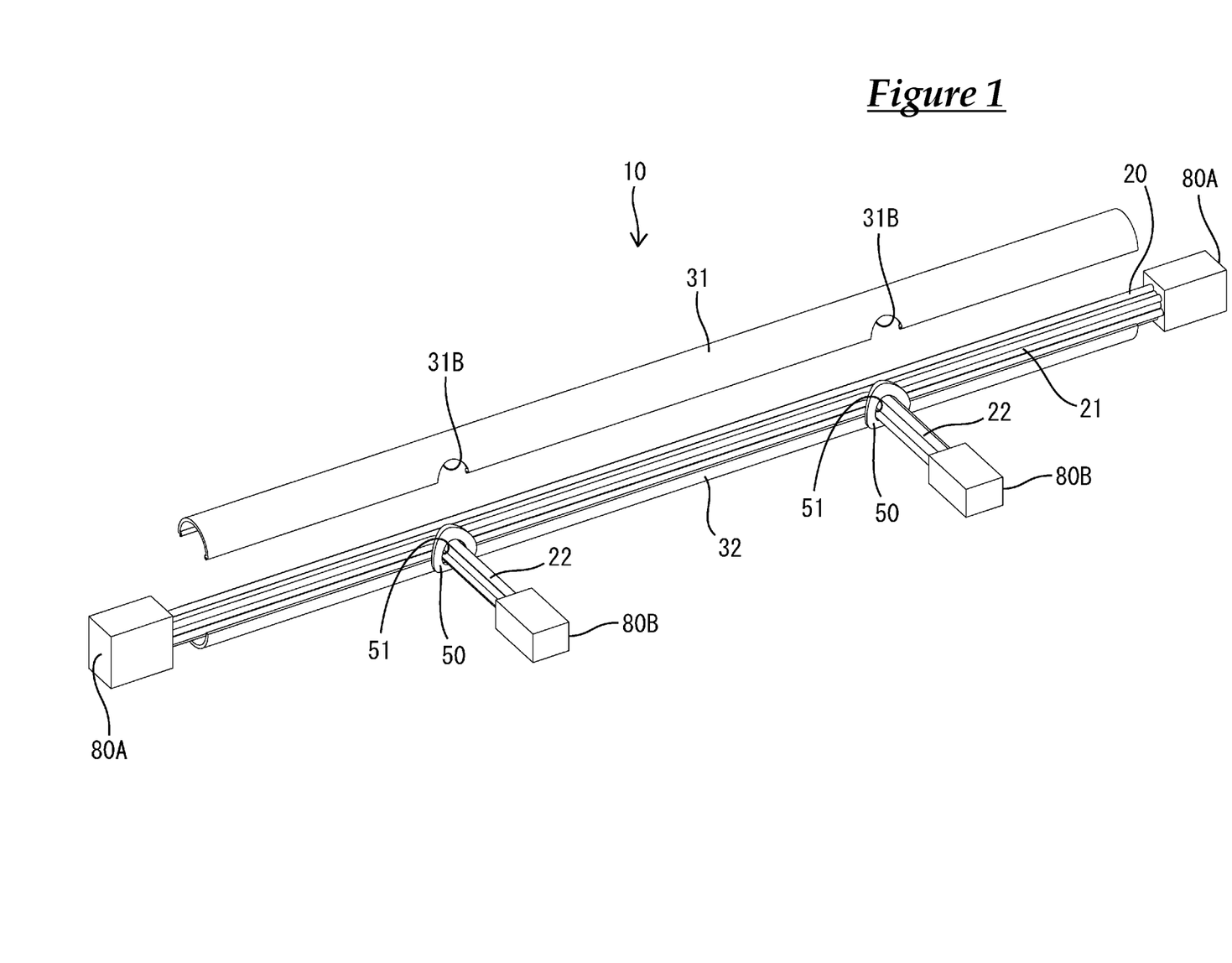
FIG. 1 is an exploded perspective view of a pipe of a wire harness according to Embodiment 1 of the present design.

Each of the wires 20 is a low-voltage wire through which a relatively small current flows, and is made up of a plurality of core wires and an insulating covering that covers each of the core wires. As shown in FIG. 1, a plurality of locations of each of the wires 20 midway in the length direction serve as branching locations where branch lines 22 are branched from a main line 21. Connectors 80A and 80B are connected to an end portion of the main line 21 and an end portion of each of the branch lines 22, respectively, of the wires 20. As shown in FIG. 8, the connectors 80B connected to the end portions of the branch lines 22 are fitted and connected, for example, to control portions 93 on the engine 92 side that respectively correspond thereto.

The pipe 30 is a metal tubular member made of aluminum or an aluminum alloy, and is rigid enough to protect the wires 20 that are inserted thereinside. The pipe 30 extends in an elongated manner so as to follow the routing path of the wires 20, and is configured to be bendable at appropriate locations in the length direction. The overall length of the pipe 30 is shorter than the overall length of the main line 21 of each wire 20, and the end portion of the main line 21 is disposed so as to extend to the outside from an end portion of the pipe 30.

Figure 2:
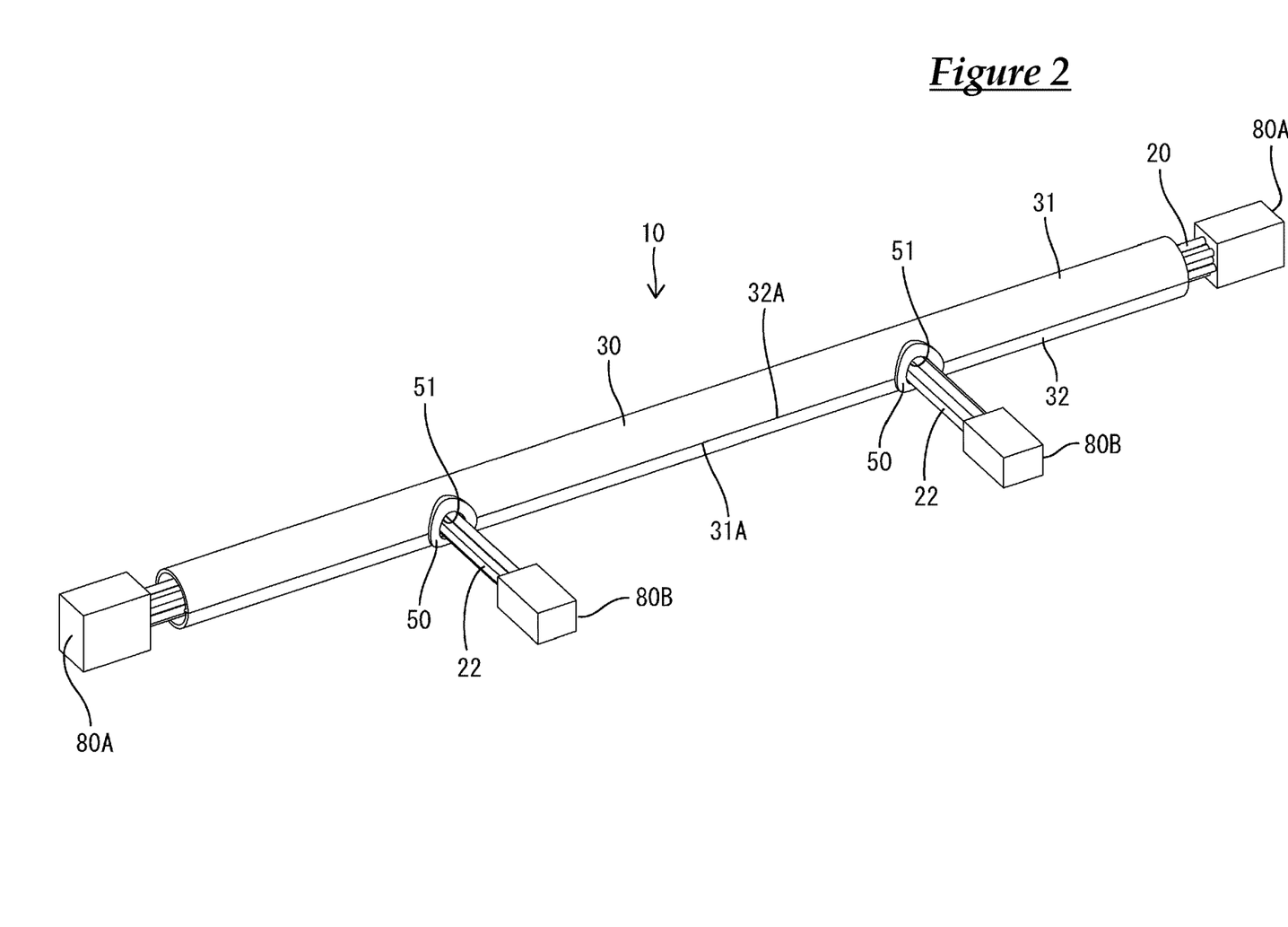
FIG. 2 is a perspective view of the wire harness.
Figure 3:
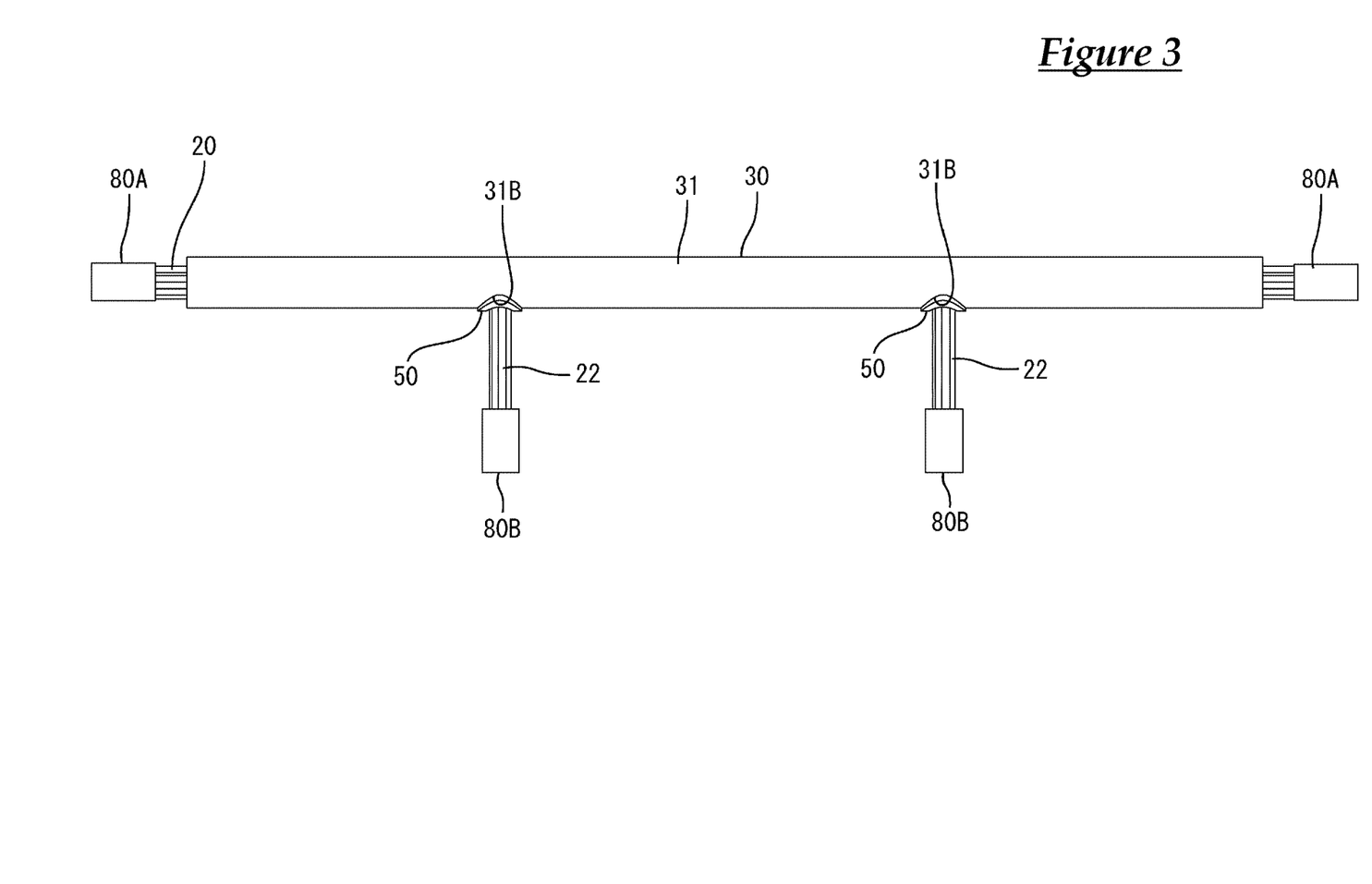
FIG. 3 is a plan view of the wire harness.
Figure 4:
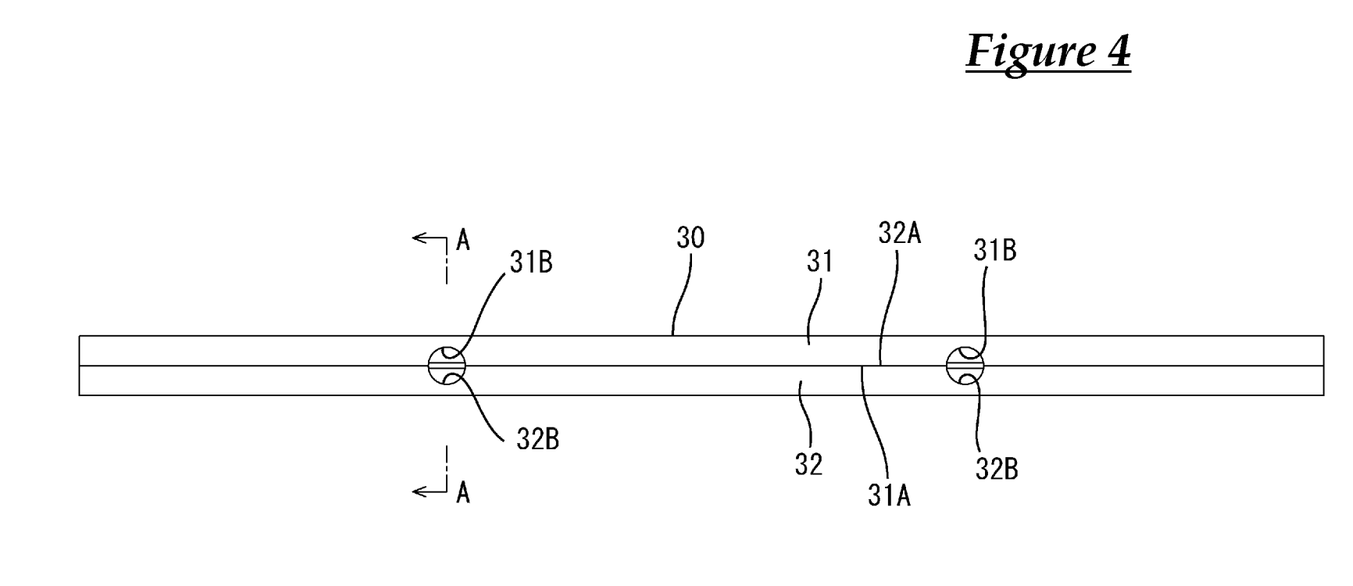
FIG. 4 is a front view of the pipe.
Figure 5:
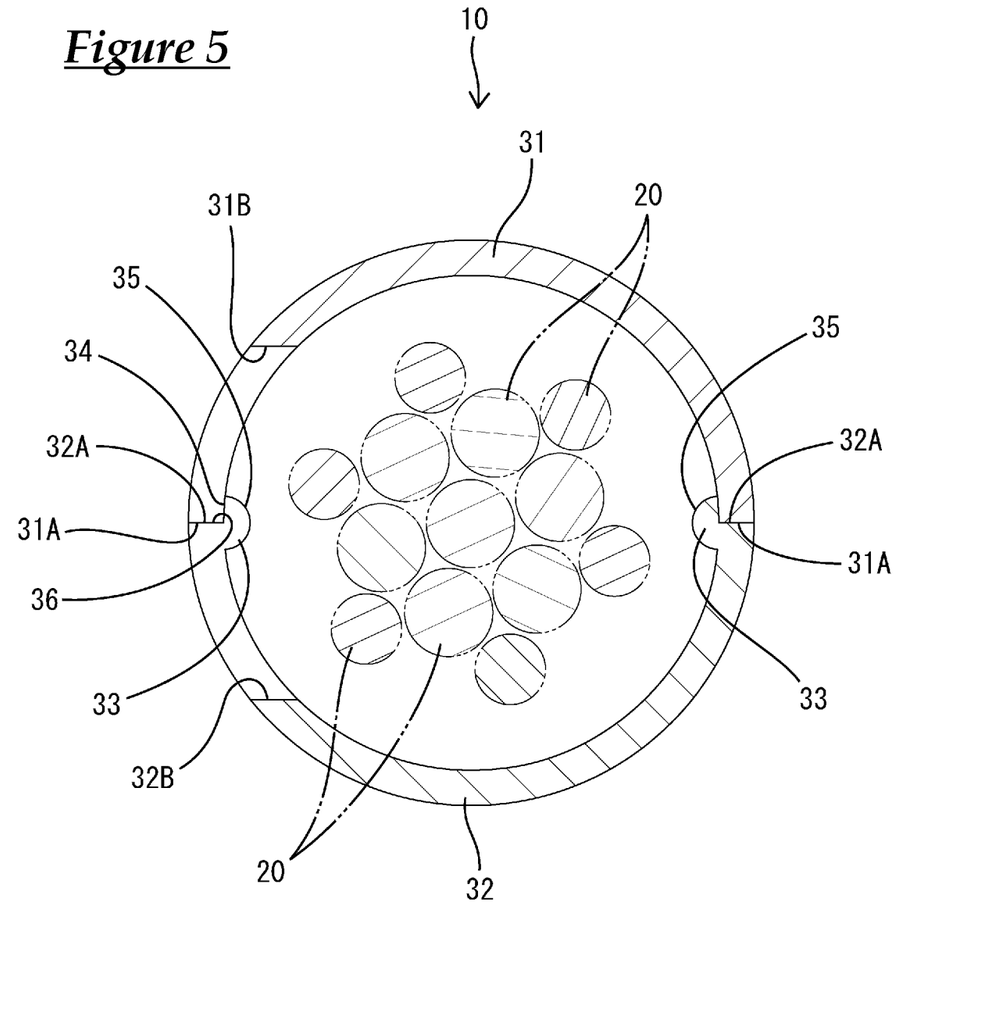
FIG. 5 is a cross-sectional view taken along the line A-A in FIG. 4.

As shown in FIGS. 1 and 2, the pipe 30 is composed of a pair of a first divided segment 31 and a second divided segment 32 that are circumferentially divided. The first divided segment 31 is located on the upper side of the pipe 30 so as to form the upper half of the pipe 30, and the second divided segment 32 is located on the lower side of the pipe 30 so as to form the lower half of the pipe 30. As shown in FIG. 5, the first divided segment 31 and the second divided segment 32 are combined into a cylindrical shape with mutually mating surfaces 31A and 32A located at circumferential end portions being abutted against each other.

Figure 6:
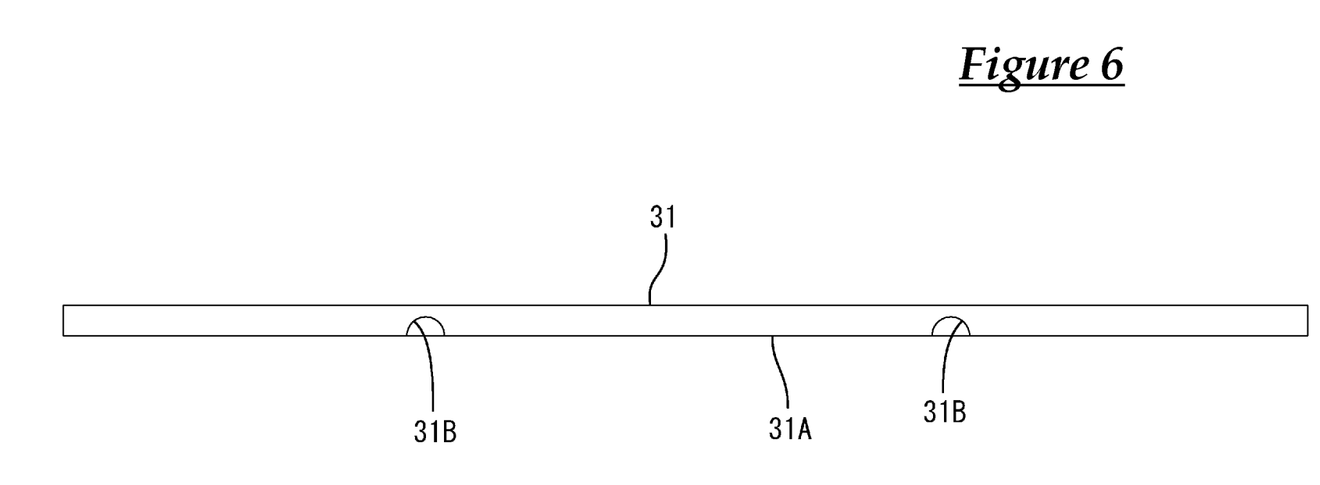
FIG. 6 is a front view of a first divided segment.

The first divided segment 31 having a semicircular arc-shaped cross section, has a circumference extending over the upper half of the circumference of the pipe 30. As shown in FIG. 6, the mating surfaces 31A of the first divided segment 31 are flat surfaces that extend continuously at the same height over the entire length of the pipe 30 except for portions where pull-out ports 31B, which will be described later, are open, and have substantially no irregularities. A pull-out port 31B that is cut out to have a semicircular cross section is opened in one of the mating surfaces 31A on circumferentially opposites sides of the first divided segment 31. Pull-out ports 31B are provided at a plurality of positions with intervals in the length direction of the first divided segment 31 so as to correspond to the branching locations of the branch lines 22 of each wire 20.

Figure 7:
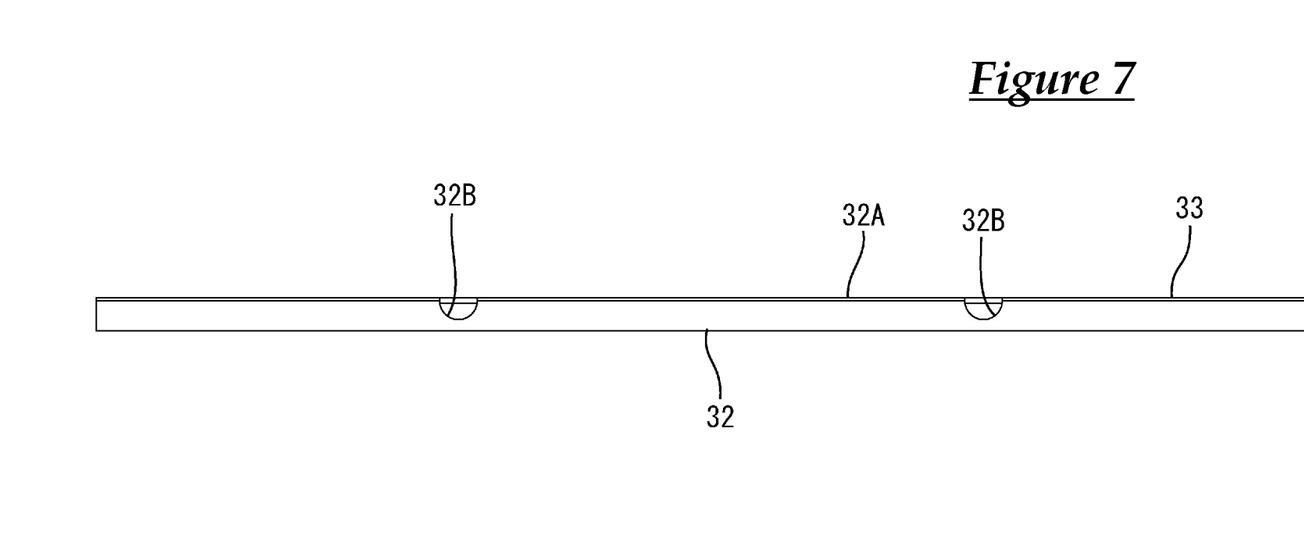
FIG. 7 is a front view of a second divided segment.

As with the first divided segment 31, the second divided segment 32 has a semicircular arc-shaped cross section, and has a circumference extending over the lower half of the circumference of the pipe 30. As shown in FIG. 7, as with the mating surfaces 31A of the first divided segment 31, the mating surfaces 32A of the second divided segment 32 are flat surfaces that extend continuously at the same height except for the opening of a pull-out port 32B, which will be described later, and have no irregularities.

Pull-out ports 32B having a semicircular cross section are open on one of the mating surfaces 32A of the second divided segment 32, and the pull-out ports 32B are located at positions corresponding to the pull-out ports 31B of the first divided segment 31, and form circular openings (hereinafter referred to as "circular pull-out ports 31B and 32B) extending continuously with the pull-out ports 31B of the first divided segment 31 in the circumferential direction when the first divided segment 31 and the second divided segment 32 are combined.

As shown in FIG. 5, at circumferentially opposite end portions of the second divided segment 32, a pair of ribs 33 protruding circumferentially inward from the inner circumferential surface of the circumferentially opposite end portions and protruding on the upper side where the first divided segment 31 is located are provided. The two ribs 33 each have a semicircular cross section, and one of the ribs 33 is cut out at a position corresponding to each of the pull-out ports 32B located midway in the length direction of the pipe 30.

Each rib 33 includes a rising surface 34 that stands upright from a radially inner end of the mating surface 32A so as to extend substantially along the up-down direction, and a curved surface 35 that protrudes in a curved manner into the space inside the pipe 30. The mating surface 32A and the rising surface 34 defines a fitting recess 36 having a substantially L-shaped cross section. When the first divided segment 31 and the second divided segment 32 are combined, the circumferential end portion of the first divided segment 31 is fitted to and held by the fitting recess 36 of the second divided segment 32 so as to be positioned in the radial direction.

A bush 50 made of a synthetic resin or rubber serving as a protection portion that protects the wires 20 is attached to each of the circular pull-out ports 31B and 32B of the first divided segment 31 and the second divided segment 32. The bushes 50 have an annular shape, and have a circular hole 51 open at its center. Each of the branch lines 22 of each wire 20 is pulled out through the hole 51 of the bush 50. Accordingly, the branch lines 22 of the wires 20 will not come into contact with edges formed at the rims of the pull-out ports 31B and 32B, making it possible to prevent the wires 20 from being damaged.

Next, a manufacturing method of the wire harness 10 according to Embodiment 1 will be described.

First, wires 20 are placed on a straight second divided segment 32 along the length direction of the second divided segment 32. Subsequently, branch lines 22 are pulled out from branching locations of the wires 20, and bushes 50 are fitted around the wires 20 constituting the branch lines 22. In this state, the respective corresponding connectors 80A and 80B are connected to end portions of a main line 21 and end portions of the branch lines 22 (see FIG. 1).

Subsequently, mating surfaces 31A of a first divided segment 31 are placed on mating surfaces 32A of the second divided segment 32 (see FIG. 2). At this time, circumferential end portions of the first divided segment 31 are fitted to fitting recesses 36, and the inner surfaces of the circumferential end portions of the first divided segment 31 are disposed along the rising surfaces 34 of the ribs 33 (see FIG. 5). Consequently, the first divided segment 31 and the second divided segment 32 are formed in a cylindrical shape so as to be continuous in the circumferential direction, and circular pull-out ports 31B and 32B are formed between the first divided segment 31 and the second divided segment 32 with the bushes 50 interposed therebetween. In addition, the main lines 21 of the wires 20 are accommodated in and protected by the cylindrical pipe 30, and the branch lines 22 are pulled out from the pull-out ports 31B and 32B and the holes 51 of the bushes 50 so as to be disposed outside. Here, even when the main lines 21 of the wires 20 interfere with the ribs 33, they come into contact with the curved surfaces 35, and thus are unlikely to be damaged.

Then, the cylindrical pipe 30 having been formed in a straight shape in the above-described manner is bent using a bender machine (not shown). In this case, an appropriate location (one location or a plurality of locations) of the pipe 30 excluding the pull-out ports 31B and 32B can be bent in conformity with the routing path of the vehicle 90. Consequently, as shown in FIG. 8, a bent portion 37 is formed in the pipe 30, and the wire harness 10 can be routed two-dimensionally or three-dimensionally via the bent portion 37.

As described thus far, according to Embodiment 1, the pipe 30 can be made to conform to the routing path of the wires 20 through bending. In addition, the pull-out ports 31B and 32B of the pipe 30 serve as the branching positions of the wires 20, thus making it possible to properly define the branched locations. Moreover, the use of the pipe 30 does not require a complex mold structure, and the wire harness can be manufactured more inexpensively than in the case of molding a resin protector using a mold as in the conventional technique.

The pull-out ports 31B and 32B are open at the respective circumferential end portions of the first divided segment 31 and the second divided segment 32 that are circumferentially divided into two with the mating surfaces 31A and 32A interposed therebeween. Accordingly, the manufacturing process is made easier, and there is no need to perform an operation of inserting the wires 20 into a cylindrical hole, making it possible to improve the operability.

Further, the first divided segment 31 and the second divided segment 32 are fixed together through welding or the like with the mating surfaces 31A and 32A being abutted against each other, thus making it possible to prevent the wire 20 from being damaged as a result of the pipe 30 being accidentally opened.

Further still, the bushes 50 serving as the protection portions for protecting the wires 20 are provided at the rims of the pull-out ports 31B and 32B, thus making it possible to protect the wires 20 from edges that may be formed at the rims of the pull-out ports 31B and 32B.

Other Embodiments

In the following, other embodiments will be described briefly.

The pull-out port may be provided only in one of the first divided segment and the second divided segment. In this case, the pull-out port may be provided midway in the circumferential direction of the first divided segment as a loop opening extending continuously without any gap.

The rim of the pull-out port may be deburred to remove the edge from the rim of the pull-out port, thus forming a protection portions for the wires.

The rib may be provided in the first divided segment, instead of the second divided segment.

The rib may not be provided in either the first divided segment or the second divided segment. In this case, the first divided segment and the second divided segment can have the same shape.

The pipe as a whole may be integrally formed, and the pull-out ports may be formed by drilling.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

10 Wire harness
20 Wire
30 Pipe
31 First divided segment
31A, 32A Mating surface
31B, 32B Pull-out port
32 Second divided segment
50 Bush (protection portion)

What is claimed is:

1. A wire harness comprising:
a tubular bendable pipe through which a wire is inserted;
the pipe includes a pull-out port of the wire at a position corresponding to a branching location of the wire;
the pipe is composed of segments that are circumferentially divided with mating surfaces interposed therebetween, and at least one of the divided segments includes the pull-out port configured to be open on the corresponding mating surface;
the divided segments are fixed together with the mating surfaces abutted against each other, wherein a pair of ribs are respectively formed adjacent to the mating surfaces of a first one of the divided segments, each rib of the pair of ribs protruding circumferentially inward from an inner circumferential surface of circumferentially opposite end portions of the first divided segment to contact and support an inner circumferential surface of circumferentially opposite end portions of an adjacent one of the divided segments from inside the pipe;
wherein the first divided segment includes a pair of fitting recesses each having a substantially L-shaped cross-section that is defined by a first mating surface and a rising surface, and wherein each of the rising surfaces is provided on one of the pair of ribs and projects upright from a radially inner end of the first mating surface.

2. The wire harness of claim 1, wherein
the pipe is composed of two divided segments.

3. The wire harness of claim 2, wherein
the two divided segments are fixed together with the mating surfaces abutted against each other.

4. The wire harness of claim 1, wherein
a protection portion that protects the wire is provided at a rim of the pull-out port.

5. The wire harness of claim 1, wherein the ribs each includes a curved surface that protrudes in a curved manner into space inside the pipe.

* * * * *